Reissued Apr. 25, 1933 Re. 18,805

UNITED STATES PATENT OFFICE

GUSTAV BERGEN, FELIX ENGELHARDT, AND RICHARD STECKHAN, OF BRUNSWICK, GERMANY, ASSIGNORS TO "MIAG" MÜHLENBAU UND INDUSTRIE AKTIENGESELLSCHAFT, OF BRUNSWICK, GERMANY

PROCESS OF MANUFACTURING WHITE PORTLAND CEMENT, ETC.

No Drawing. Continuation of original application Serial No. 171,366, filed February 26, 1927. Patent No. 1,865,418, dated June 28, 1932, Serial No. 573,304, filed November 5, 1931, and in Germany January 27, 1927. Application for reissue filed December 16, 1932. Serial No. 647,696.

This invention relates to the manufacture of cement and more particularly of a white or nearly white Portland cement.

One of the primary objects is the preparation of a cement of the character indicated from raw materials, such as clays, which have heretofore not been considered particularly adaptable for the production of a white cement.

A still further object is the production of a white Portland cement from colored clays containing relatively large quantities of coloring impurities such as metallic oxides, principally the oxides of iron.

Yet another object is the preparation of a cement as specified from highly colored clays, in that the colored oxides are converted into colorless glass-like materials which are retained in the finished cement without affecting the properties thereof.

This application constitutes a continuation of our prior application, Serial No. 171,366, filed February 26, 1927.

Other objects than those above enumerated will be apparent from the detailed description hereinafter appearing and from the claims hereto appended.

In most instances, heretofore, when it was desired to manufacture a substantially white Portland cement, a clay, such as kaolin, containing only very small quantities of decolorizing oxides, not more than 1%, was utilized as a starting material. However, such a clay is found in relatively small quantities and is comparatively expensive. In distinction to kaolin very large quantities of cheap clay containing from 2 to 5% of colored oxides is available, but when such clays were used the finished Portland cement was also found to be highly colored.

It has been suggested in the manufacture of Portland cement as in U. S. Patent 1,239,912 to remove iron oxide from raw materials for cement manufacture by adding calcium chloride to the mix and treating the whole with superheated steam to cause a reaction between the calcium chloride and the iron oxide and to vaporize the iron chloride resulting from the reaction of calcium chloride and iron oxide, thus completely removing the iron from the cement and producing a white cement. However, the use of superheated steam, as a step in the process, is an additional feature in the usual method of making Portland cement and is objectionable due to the great cost of operation and supplementary apparatus necessary.

In our process the usual steps in the manufacture of cement are followed, and consists in adding suitable substances to the ground raw materials which when heated are combined with the colored impurities of the clay to form colorless reaction products or melts. Compounds suitable for this purpose are salts of phosphorus and boron, used separately or mixed with each other, which compounds flux together with the colored oxides at a temperature below that of sintering to form colorless reaction products. The latter upon further heating remain unchanged and do not react with the other raw materials to form colored substances. The resulting clinkers are found to be practically white and are further treated for completing the manufacture of cement therefrom.

The quantity and character of the phosphates or borates to be added to the powdered colored raw materials depends on the amount and the character of the coloring matter contained therein. Further, it has been found advantageous in a good many instances to use a temperature reducing agent, such as fluorspar, together with the phosphate and borate. Appearing below are two examples of the portions of the materials used.

*Example 1.*—We mix 100 kg. of the ground raw material with 4 kg. of fluorspar, and 1 kg. of phosphate of sodium, and burn the mixture in a furnace. The lumps thus obtained are ground and further treated for manufacturing cement therefrom.

*Example 2.*—We mix 100 kg. of the ground raw material with 4 kg. of fluorspar, 0,5 kg. of phosphate of sodium, and 0,5 kg. of borax, and burn the mixture at a sintering temperature. The lumps thus obtained are ground and further treated for manufacturing cement therefrom.

It will be noted that in each of the examples appearing above the quantity of the decolorizing agent we have used is very small and is found to have no harmful effect upon the final product. It is again desired to stress at this point that we use clays containing from 2 to 5% of oxides of iron and that the reaction products between the oxides of iron and of phosphates and borates are colorless glass-like substances which are produced as such prior to the sintering temperature of the mass, which substances remain in and constitute a very small percentage of the finished product.

A somewhat modified procedure from that above appearing is the addition of a reducing agent to the raw materials in addition to a phosphate or borate, and the heating of the mixture in a reducing zone of the burning furnace. Here the colored oxides are reduced to the metallic state, and can be removed by well known dry methods, for example, as by a magnet. An illustration of the proportions of the materials used appears below.

*Example 3.*—We mix 100 kg. of the ground raw material with 2 kg. of fluorspar, 3 kg. of coke, and 0,5 kg. of borax, and burn the mixture at a sintering temperature in a reducing flame. The lumps thus obtained are ground into coarse form, and the iron is partially removed by means of a magnet. Thereafter the matter is finally ground and the iron particles are completely removed by further action of a magnet.

The modified process of preparing cement from raw materials which are strongly colored with metallic oxides, according to which process coke is used in addition to borax and fluorspar, is intended to convert the iron of the raw material into metallic iron to the utmost possible extent, which metallic iron can then be separated from the cement by magnetic means. The remaining minute quantities of iron will then be changed by the addition of borax into colorless glass-like materials, which remain in the mass. If one were to attempt to change all the iron into colorless glass-like materials by the use of borax or phosphates in those cases where the raw cement material contains a relatively high percentage of iron, then the properties of the completed cement would be undesirably affected. In order to avoid such undesirable effects it is preferable to remove the greater part of the iron from the raw material by reducing it, as above described. When so reduced the metallic iron that can be removed by magnetic means need not then be changed into glass-like material but only those small traces of iron which still remain in the raw material will need to be so altered.

From the above description, it will be seen that our novel process contemplates the manufacture of white cement from colored clays, which though abundant and cheap, were heretofore considered ill adapted for the purpose. Further, it will be noted that our process calls for no radical departure from the accepted procedure in the manufacture of cement, but merely contemplates the addition to the raw materials of substances which are adapted to decolorize the clays at temperatures which preclude the formation of colored compounds upon further treatment and which in no way affect the final properties of the cement. It will also be appreciated that our process is applicable to all cases where the decolorization of high colored clays finds utility; also if desired, in the manufacture of cement, the ferruginous clays can be decolorized by our process before admixture with the limestone.

In a modification of the process the raw materials and the substances added thereto are completely molten, thereafter granulated, and finally treated in the manner known in the art.

Having thus fully described our said invention, what we claim as new and desire to secure by Letters Patent is:

1. A process of cement manufacture comprising adding to raw materials which include clay having sufficient iron as an ingredient to discolor the cement, a sufficient quantity of a flux of the group consisting of borates and phosphates to produce a colorless cement, and heating the mixture to change the same into cement.

2. A process of cement manufacture comprising adding to raw materials which include clay having sufficient metallic oxide as an ingredient to discolor the cement, a sufficient quantity of a flux of the group consisting of borates and phosphates to produce a colorless cement, and heating the mixture to change the same into cement.

3. A process of cement manufacture comprising adding to raw materials which include clay having sufficient iron as an ingredient to discolor the cement, carbonaceous fuel and a quantity of a flux of the group consisting of borates and phosphates to produce a colorless cement, and heating the mixture in a reducing flame to change the same into cement.

4. A process of cement manufacture comprising adding to raw materials which include clay having sufficient iron as an ingredient to discolor the cement, carbonaceous fuel and a sufficient quantity of a flux of the group consisting of borates and phosphates to produce a colorless cement, heating the mixture in a reducing flame to change the same into cement, disintegrating the clinkers, and removing the particles of metallic iron, 5. A process of cement manufacture comprising adding to raw materials which include clay having sufficient iron as an ingredient to discolor the cement, a sufficient quantity of a flux of the group consisting of borates and phosphates to produce a colorless cement also adding a fluoride to reduce the sintering temperature, and heating the mixture to change the same into cement clinker.

6. A process of cement manufacture comprising adding to raw materials which include clay having sufficient metallic oxide as an ingredient to discolor the cement, a sufficient quantity of a flux of the group consisting of borates and phosphates to produce a colorless cement, also adding a fluoride to reduce the sintering temperature, and heating the mixture to change the same into cement clinker.

7. A white Portland cement containing a sufficient amount of metallic oxides to normally discolor the cement, said oxides being present in the form of colorless compounds produced by a substance from the group consisting of borates and phosphates.

8. The herein described process of manufacturing cement, which consists in adding fluorspar and borax to ground raw material containing coloring matter, sintering the mixture, and thereafter treating the same for manufacturing cement.

9. The herein described process of manufacturing cement, which consists in adding fluorspar and borax to ground raw material containing coloring matter, melting the mixture, granulating the same, and thereafter treating the same for transforming the same into cement.

In testimony whereof we affix our signatures.

GUSTAV BERGEN.
FELIX ENGELHARDT.
RICHARD STECKHAN.